Sept. 7, 1937. C. HUNGERFORD ET AL 2,092,716
WATER CONDITIONING APPARATUS
Filed Dec. 31, 1935
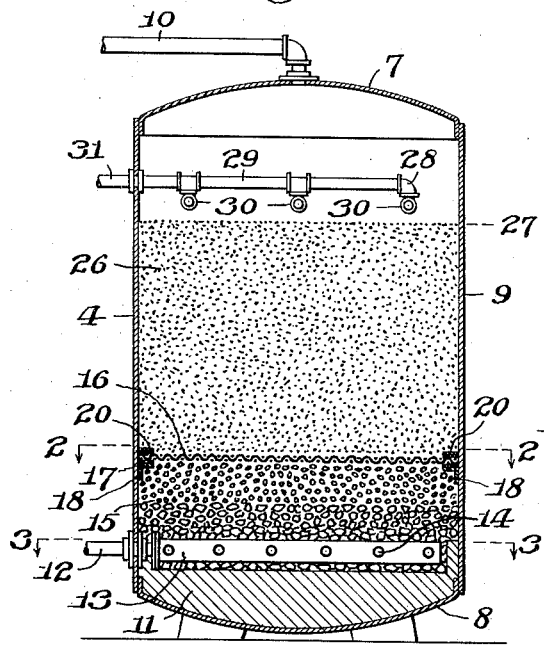
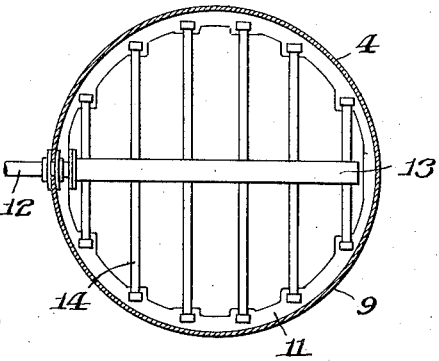
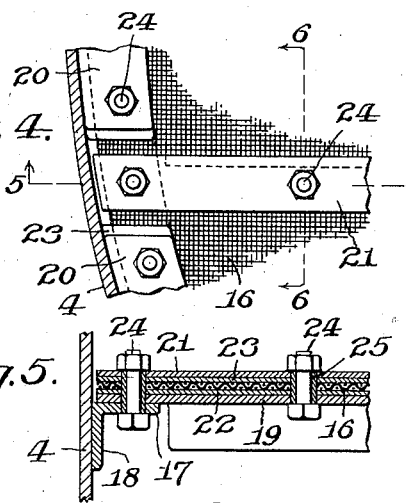
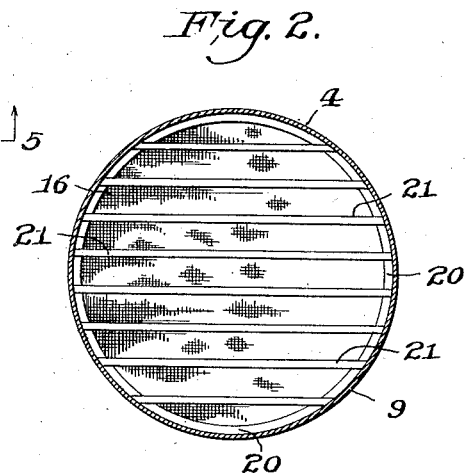
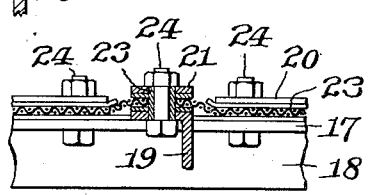
INVENTORS:
Churchill Hungerford
and Bruce Dickerson
BY
A. V. Groupe
ATTORNEY Patented Sept. 7, 1937

2,092,716

UNITED STATES PATENT OFFICE 2,092,716

WATER CONDITIONING APPARATUS

Churchill Hungerford, Wenonah, and Bruce Dickerson, Glassboro, N. J., assignors to Hungerford and Terry, Inc., Clayton, N. J., a corporation of Delaware Application December 31, 1935, Serial No. 56,868

3 Claims. (Cl. 210—24)

This invention relates to improvements in that type of water conditioning apparatus which includes a suitable casing having a bed of layers of graded gravel in the lower portion thereof and a bed of granular water conditioning elements above the bed of gravel, and having a water passage communicating with the casing above the bed of conditioning elements, and a water passage communicating with the casing through receiving and discharging orifices of a strainer system within or below the lower portion of the bed of gravel.

This type of apparatus is used for filtering water and for softening water. When it is used for filtering purposes the conditioning elements are grains of sand or their equivalent, and when it is used for softening purposes the conditioning elements are grains of zeolite or equivalent exchange material.

In using the apparatus for either filtering or softening purposes, water is caused to flow through the water passages and the casing in upwardly and downwardly directions alternately during the usual well known cycles of operations, for the purposes of filtering water and for washing or cleansing the sand when sand forms the bed of conditioning elements, and for the purposes of softening water and for washing and regenerating the grains of zeolite when they form the bed of conditioning elements.

The bed of gravel in the lower portion of the casing is composed of superposed layers of pebbles of progressively decreasing pebble size from the bottom to the top of the bed for the usual purposes of properly distributing and collecting the water in accordance with its direction of flow and for the purpose of arresting the downward movement of the grains of the bed of granular water conditioning elements as the grains thereof enter or tend to enter the bed of gravel.

Heretofore, due to various influences, well known in the art, the layers of gravel and particularly the final or upper layers frequently become disturbed or displaced by the flow of water through the gravel bed, forming mounds in some places and depressions in other places, so that at length a condition is reached where the finest or uppermost layer of gravel is washed aside in places and the granular conditioning elements rest upon a coarser layer of gravel. This coarser layer in turn becomes disturbed and the process repeats until a layer of gravel is reached that is not fine enough to restrain the downward movement of the grains of the conditioning elements and then such grains begin to appear in the conditioned water. In addition to this the lower layers of gravel, whose function is to evenly distribute and collect water between the orifices of the strainer system, become charged with the grains of the conditioning elements, and as a result thereof the water is unevenly distributed and collected by the strainer system, resulting in the uneven flow of the water in each direction and the delivery thereof to the gravel in a series of jets whose action soon so disturbs the gravel bed as to cause an almost complete cessation of the proper functions of the apparatus during the cycles of operations thereof.

The object of our invention is to overcome the objections aforesaid by the provision of a water conditioning apparatus of novel and advantageous construction having means whereby the objectionable shifting or displacement of parts of the gravel bed will be prevented and whereby the desired relationship of the bed of gravel to the strainer system and to the bed of granular water conditioning elements above the same will be preserved for the proper functioning of the apparatus.

With the foregoing object in view the invention resides in the novel construction, combination and arrangement of elements hereinafter described and claimed.

In the accompanying drawing, illustrating the invention,

Figure 1 is a vertical section of a water conditioning apparatus constructed in accordance with the invention.

Figure 2 is a horizontal section thereof, on line 2—2 of Fig. 1.

Figure 3 is a horizontal section, on line 3—3 of Fig. 1.

Figure 4 is a fragmentary top view of one side of the screen and associated parts.

Figure 5 is a vertical section through the parts shown in Fig. 4, on line 5—5 of Fig. 4.

Figure 6 is a vertical section through the parts shown in Fig. 4, on line 6—6 of Fig. 4.

Referring to the drawing, 4 designates a suitable casing which may be of any appropriate size and construction for its intended purpose. As herein illustrated, this casing comprises a top wall 7 and a bottom wall 8 connected by an annular wall 9.

A pipe 10 communicates with the upper portion of the casing and affords a passage through which water may be caused to flow into or from within the upper portion of the casing.

The bottom of the casing 4 contains a base or bed of concrete 11 which supports a water distributing and collecting system or manifold comprising a centrally arranged main pipe 13 and branch pipes 14 extending laterally from the main pipe and provided with bottom perforations through which water may enter and leave the manifold. One end of the main pipe 13 is closed and the other end thereof is connected to a water pipe 12 which extends outwardly from the casing, and with the manifold affords a passage through which water may be caused to flow into or from within the lower portion of the casing.

The pipes of the manifold are embedded in the lower portion of a bed of gravel 15 which rests upon the base 11, and the pebbles of which are arranged in superposed layers of progressively decreasing pebble size from the bottom to the top of the bed in accordance with the usual practice in this art.

Directly over and in close proximity to the top of the uppermost layer of gravel of the gravel bed 15 is a screen 16 preferably formed of woven wire. This screen covers the entire gravel bed and its interstices are smaller than the pebbles of the top layer of gravel for the purpose of preventing upward displacement of the gravel bed or parts thereof under the influence of the flow of water through the bed.

The screen 16 is mounted upon the inwardly extending flange 17 of an angle iron annulus 18 which is fitted to the inner wall of the casing and suitably secured thereto preferably by welding; and the screen 16 is also mounted upon spaced stiffening bars 19 which are formed of angle iron and extend between and have their end portions resting upon opposite parts of the flange 17 of the annulus 18, as illustrated in the drawing.

Located over the edge portion of the screen 16 which is over the flange 17 away from the bars 19 are clamping plates 20, and located over the parts of the screen 16 which are over the bars 19 are clamping plates 21.

Interposed between the bottom of the screen 16 and the top of the flange 17 and bars 19 are strips of rubber 22, and interposed between the top of the screen 16 and the bottom of the clamping plates 20 and 21 are strips of rubber 23.

The clamping plates 20 and 21 and the screen 16 and the rubber strips 22 and 23 are secured to the underlying annulus flange 17 and stiffening bars 19 by suitable bolts 24, and the bolts 24 at the ends of the bars 19 also serve as a means to secure the ends of the bars to the flange 17.

The bolts 24 are provided with rubber sleeves 25 which surround the same between the bodies thereof and the portions of the screen through which the bolts extend, for a purpose presently appearing.

It has been found desirable to make the screen 16 of copper wire and to make the casing 4, annulus 18, bars 19, plates 20 and 21 and bolts 24 of iron or steel, and as copper and iron or steel differ materially in their potentials, the interposed rubber strips 22 and 23 and sleeves 25 serve to insulate the copper from the iron or steel for the prevention of the decomposition of the parts by the flow of electricity from the iron or steel to the copper which would take place if the dissimilar metals were not insulated from each other by the interposed rubber.

The grains of the bed of water conditioning elements 26 are smaller than the interstices of the screen 16 to permit such grains to pass freely through the screen to and from the gravel bed for the proper functioning of the apparatus; and, when the bed of elements 26 is at rest within the casing, it is supported normally upon the screen 16 and the underlying bed of gravel 15, and it extends from the screen 16 to the level indicated at 27, providing a suitable space or free board between the normal level of the bed 26 and the top of the casing.

The granular water conditioning elements 26 may be sand grains when the apparatus is used to condition water by the filtration thereof, and such elements may be zeolite grains when the apparatus is used to condition water by the softening thereof. In either case the screen 16, while permitting the free upward and downward flow of the water for the various operations hereinbefore referred to, will hold the pebbles of the gravel bed in a packed condition between it and the base 11 and thereby prevent the pebbles from being disturbed or displaced by the flow of water during any of the aforesaid operations of the apparatus when it is in service.

When the apparatus is used for softening water it is necessary to provide a means for the introduction of brine into the upper portion of the casing for the regeneration of the grains of the water softening exchange material or elements. For this purpose there is arranged above the top of the bed of granular conditioning elements 26 a brine distributing manifold 28 comprising a horizontally extending pipe 29 provided with suitably spaced T outlet fittings 30. The pipe 29 is connected to a brine supplying pipe 31 which extends outwardly from the casing 4 and through which and the manifold 28 brine may be introduced into the casing.

When herein we speak of "granular water conditioning elements" we mean to include thereby elements, such as grains of sand which will effect a water filtering operation, and elements, such as grains of zeolite which will effect a water softening operation.

We claim:

1. In an apparatus of the character described, a casing having a flange extending inwardly from the inner wall thereof, a bed of gravel in the lower portion of the casing, a bed of granular water conditioning elements in the casing above the bed of gravel therein, spaced stiffening bars connecting opposite parts of said flange, a wire screen on said flange and said bars and extending between said beds, clamping plates above said screen and above said flange and said bars, rubber insulating elements interposed between said screen and said flange and said bars, rubber insulating elements interposed between said screen and said plates, bolts securing said plates and said screen and said insulating elements to said flange and said bars, and rubber insulating sleeves surrounding said bolts between them and said screen, said screen having interstices of sufficient smallness to prevent upward displacement of gravel of the first named bed, and said casing having a water passage communicating therewith above the second named bed and a water passage communicating therewith below the first named bed.

2. In an apparatus of the character described, a casing having an annular flange extending inwardly from the inner wall thereof, laterally spaced bars connecting opposite parts of the flange and having their respective end portions resting thereon, laterally spaced clamping plates corresponding with said bars and located above the same, a continuous screen extending between said bars and said plates and over said flange and the space surrounded thereby, bolts securing said screen and said flange and the end portions of said bars and said plates together, means for securing said screen to said flange between said bars, bolts securing said screen and said bars and said plates together intermediate the end portions of said bars and said plates, a bed of gravel within the casing below said screen, and a bed of water conditioning elements within the casing above said screen, said casing having a water passage communicating therewith below the first named bed and a water passage communicating therewith above the second named bed.

3. In an apparatus of the character described, a casing having an annular flange extending inwardly from the inner wall thereof, laterally spaced bars connecting opposite parts of the flange and having their respective end portions resting thereon, laterally spaced clamping plates corresponding with said bars and located above the same, clamping plates above said flange and extending between the end portions of the first named plates and having their ends spaced from the sides of the first named plates, a continuous screen extending over said bars and said flange and the space surrounded by the flange and under said plates, bolts securing said screen and said flange and the end portions of said bars and the first named plates together, bolts securing the screen and said bars and the first named plates together intermediate the end portions of the bars and plates, bolts securing the second named plates and the screen and said flange together, a bed of gravel within the casing below said screen, and a bed of water conditioning elements within the casing above said screen, said casing having a water passage communication therewith below the first named bed and a water passage communicating therewith above the second named bed.

CHURCHILL HUNGERFORD.
BRUCE DICKERSON.